US006066714A

United States Patent [19]
Putzig et al.

[11] Patent Number: 6,066,714
[45] Date of Patent: May 23, 2000

[54] TITANIUM-CONTAINING CATALYST COMPOSITION AND PROCESSES THEREFOR AND THEREWITH

[75] Inventors: Donald Edward Putzig, Newark; Edward Francis McBride, Wilmington; Hiep Quang Do, Newark, all of Del.; James Arthur Trainham, Wilmington, N.C.; Hermann Ludwig Jaeger, Hamm; Heiner Schulte, Munster, both of Germany

[73] Assignee: E. I. du Pont de Nemours and Company, Wilmington, Del.

[21] Appl. No.: 09/291,960

[22] Filed: Apr. 15, 1999

Related U.S. Application Data

[63] Continuation-in-part of application No. 09/062,463, Apr. 17, 1998.

[51] Int. Cl.[7] .............................. C08G 63/78; B01J 31/00
[52] U.S. Cl. .................. 528/279; 528/272; 528/275; 528/280; 528/282; 528/285; 528/286; 528/298; 528/300; 528/301; 528/302; 528/306; 528/307; 528/308; 528/308.6; 524/706; 524/710; 524/714; 524/724; 524/765; 524/766; 524/783; 524/785; 524/786; 524/796; 502/102; 502/103; 502/104; 502/111; 502/121; 502/123
[58] Field of Search ................................... 528/272, 275, 528/279, 280, 282, 285, 286, 298, 300, 301, 302, 306, 307, 308, 308.6; 524/706, 710, 714, 724, 765, 766, 783, 785, 786, 796; 502/102, 103, 104, 111, 121, 123

[56] References Cited

U.S. PATENT DOCUMENTS 5,674,801 10/1997 George ................................ 502/327

*Primary Examiner*—Samuel A. Acquah

[57] ABSTRACT

A catalyst composition is disclosed. The composition comprises a titanium compound, a phosphorus compound, an amine, a solvent and optionally a cocatalyst in which the phosphorus compound has a formula selected from the group consisting of $(R^1O)_x(PO)(OH)_{3-x}$, $(R^1O)_y(P_2O_3)(OH)_{4-y}$, and combinations thereof; the amine is a tertiary amine; each $R^1$ is independently a linear or branched alkyl radical containing from 1 to about 20 carbon atoms per radical; x is 1 or 2; and y is 1, 2, or 3; and the cocatalyst can be a cobalt/aluminum catalyst, an antimony compound, or combinations thereof. Also disclosed is a process for producing the composition. The process comprises combining a titanium compound, a phosphorus compound, a solvent, an amine, a solvent, and optionally a cocatalyst. The phosphorus compound, amie, and solvent are the same as those disclosed above. Further disclosed is a process for using the composition which comprises contacting a carbonyl compound, in the presence of the composition, with an alcohol under a condition suitable for esterification, transesterification, polymerization, or combinations thereof.

50 Claims, No Drawings

6,066,714

TITANIUM-CONTAINING CATALYST COMPOSITION AND PROCESSES THEREFOR AND THEREWITH

This is a continuation-in-part of application Ser. No. 09/062,463 filed Apr. 17, 1998, now pending.

FIELD OF INVENTION

This invention relates to a catalyst composition comprising a titanium compound, to a process for producing the composition, and to a process for using the composition in, for example, esterification, transesterification, or polymerization of a carbonyl compound.

BACKGROUND OF THE INVENTION

Polyesters such as, for example, polyethylene terephthalate (PET) and polybutylene terephthalate (PBT), generally referred to as "polyalkylene terephthalates", are a class of important industrial polymers. They are widely used in thermoplastic fibers, films, and molding applications.

Polyalkylene terephthalates can be produced by transesterification of a dialkyl terephthalate ester with a glycol or by direct esterification of terephthalic acid with the selected glycol followed by polycondensation. A catalyst is used to catalyze the esterification, transesterification or polycondensation.

Many commercial processes use manganese or zinc salts as the catalyst for the transesterification step. Antimony, in the form of a glycol solution of antimony oxide, typically is used as the polycondensation catalyst in either the transesterification or direct esterification process outlined above. However, antimony forms insoluble antimony complexes that plugs fiber spinnerets. Furthermore, the use of antimony catalysts is generally less environmentally friendly, especially in food contact applications.

Organic titanates, such as tetraisopropyl and tetra n-butyl titanates, are known to be effective polycondensation catalysts for preparing polyalkylene terephthalates in general, and frequently are the catalyst of choice. However, organic titanates are not generally used in producing PET because residual titanate tends to react with trace impurities, such as aldehydes, formed during the polycondensation and processing of PET thereby generating undesirable yellow discoloration. Additionally, many organic titanate catalysts are also substantially insoluble in a polymerization mixture thereby creating non-uniform distribution of catalyst in the mixture.

Therefore, there is an increasing need for the development of a new catalyst that is substantially soluble, efficient, and produces a polymer with reduced color.

An advantage of the present invention catalyst composition is that, when used in producing a particular polyalkylene terephthalate, it has a high reactivity and the polymer produced therefrom has improved optical properties (e.g., less undesirable color) compared to polymer produced using previously known organic titanate catalysts. Other advantages will become more apparent as the invention is more fully disclosed hereinbelow.

SUMMARY OF THE INVENTION

According to a first embodiment of the present invention, a catalyst composition, which can be used as an esterification or transesterification catalyst, or as a polycondensation catalyst to produce polyalkylene terephthalates, is provided. The composition comprises an organic titanium compound, a phosphorus compound, a tertiary amine, and optionally a cocatalyst.

According to a second embodiment of the present invention a process for the production of a catalyst composition is provided. The process comprises combining a solvent, an organic titanium compound, a phosphorus compound, a tertiary amine, and optionally a cocatalyst.

According to a third embodiment of the present invention, a process which can be used in, for example, the production of an ester or polyester is provided. The process comprises contacting, in the presence of a catalyst composition, a carbonyl compound with an alcohol. The catalyst composition is the same as that disclosed above.

DETAILED DESCRIPTION OF THE INVENTION

According to the first embodiment of the present invention, a catalyst composition is provided. The composition can comprise an organic titanium compound, a phosphorus compound, an amine, and optionally a cocatalyst. The composition can also consist essentially or consist of an organic titanium compound, a phosphorus compound, an amine, and a cocatalyst.

The catalyst composition of this invention is substantially soluble in a solvent. The term "substantially" means more than trivial. It is preferred that the composition be completely soluble in the solvent. However, a substantial portion of the composition can also be suspended or dispersed in the solvent. According to the present invention the presently preferred titanium compounds are organic titanium compounds. Titanium tetrahydrocarbyloxides are presently the most preferred organic titanium compounds because they are readily available and effective. Examples of suitable titanium tetrahydrocarbyloxide compounds include those expressed by the general formula $Ti(OR)_4$ where each R is individually selected from an alkyl, cycloalkyl, aralkyl, hydrocarbyl radical containing from 1 to about 30, preferably 2 to about 18, and most preferably 2 to 12 carbon atoms per radical and each R can be the same or different. Titanium tetrahydrocarbyloxides in which the hydrocarbyl group contains from 2 to about 12 carbon atoms per radical which is a linear or branched alkyl radical are most preferred because they are relatively inexpensive, more readily available, and effective in forming the solution. Suitable titanium tetrahydrocarbyloxides include, but are not limited to, titanium tetraethoxide, titanium propoxide, titanium isopropoxide, titanium tetra-n-butoxide, titanium tetrahexoxide, titanium tetra 2-ethylhexoxide, titanium tetraoctoxide, and combinations of any two or more thereof.

The presence of a halide, or of other active substituent, in the R group generally is avoided since such substituents can interfere with catalytic reactions or form undesired by-products, which can contaminate the polymer when the titanium compound is used for producing a polymer. Presently it is also preferred that the each R group is identical to facilitate synthesis of the organic titanate. In some cases two or more R groups can be from a common compound chemically bonded together other than at the titanium atom (i.e., multidentate ligands such as triethanolamine, citric acid, or lactic acid).

The titanium tetrahydrocarbyloxides suitable for use in the present invention can also be produced by, for example, mixing titanium tetrachloride and an alcohol in the presence of a base, such as ammonia, to form the tetraalkyl titanate. The alcohol typically is ethanol, n-propanol, isopropanol, n-butanol, or isobutanol. Methanol generally is not employed because the resulting tetramethyl titanate is insoluble in the reaction mixture, complicating its isolation.

Tetraalkyl titanates thus produced can be recovered by first removing by-product ammonium chloride by any means known to one skilled in the art such as filtration followed by distilling the tetraalkyl titanate from the reaction mixture. This process can be carried out at a temperature in the range of from about 0 to about 150° C. Titanates having longer alkyl groups can also be produced by transesterification of those having R groups up to $C_4$ with alcohols having more than 4 carbon atoms per molecule.

Examples of commercially available organic titanium compounds include, but are not limited to, Tyzor® TPT and Tyzor® TBT (tetra isopropyl titanate and tetra n-butyl titanate, respectively) available from E. I. du Pont de Nemours and Company, Wilmington, Del., U.S.A.

The presently preferred phosphorus compound is an organic phosphorus compound. The presently most preferred phosphorus compound has the formula selected from the group consisting of $(R^1O)_x(PO)(OH)_{3-x}$, $(R^1O)_y(OH)_{4-y}$ $(P_{2O3})$, and combinations thereof in which each $R^1$ is the same or different and can be selected from a linear or branched alkyl radical, or combinations of two or more thereof containing from 1 to about 20, preferably 1 to about 15, and most preferably 1 to 10 carbon atoms per radical; x is 1 or 2; and y is 1, 2, or 3. Each radical can be substituted or unsubstituted. Each $R^1$ can also be substituted with a hydroxyl group. Wishing not to be bound by theory, it appears that the phosphorus compounds bind to an organic titanium compound during preparation of the catalyst composition thereby improving the solubility of the titanium compound and aiding in control of the optical properties on the polyester produced using these compounds.

It is presently most preferred that $R^1$ radical is unsubstituted alkyl radical having up to 8 carbon atoms. However, the radical can also be substituted with substituent group(s) that do not unduly interfere with preparation of the catalyst composition or its subsequent use. Examples of suitable phosphorus compounds include, but are not limited to, butyl phosphate, dibutyl phosphate, propyl phosphate, dipropyl phosphate, ethyl pyrophosphate, diethyl pyrophosphate, triethyl pyrophosphate, butyl pyrophosphate, dibutyl pyrophosphate, tributyl pyrophosphate, octyl phosphate, dioctyl phosphate, nonyl phosphate, dinonylphosphate, and combinations of two or more thereof. A mixture of butyl and dibutyl phosphate, with butyl pyrophosphates, is particularly preferred.

The organic phosphorus compounds are commercially available or can be produced by the contacting of an alcohol with phosphorus oxide. For example, a mixture of mono- and dibutyl phosphate and butyl pyrophosphates can be produced by contacting phosphorus pentoxide with n-butanol.

According to the present invention, the amine is a tertiary having the formula of $(R^2)_3N$ in which $R^2$ is alkyl, alkoxyalkyl, hydroxyalkyl, hydroxyalkoxyalkyl, or combinations of two or more thereof. The presently most preferred amine is a tertiary amine with one alkanol substituent. These amines are well known in the art and generally available commercially. Examples of suitable amines include, but are not limited to, 2[2-(dimethylamino)ethoxy]ethanol, 2-dimethylaminoethanol, 2-diethylaminoethanol, and tetramethylethylenediamine and combinations of two or more thereof.

Any solvent that can substantially dissolve the catalyst composition disclosed above can be used in the present invention. The presently preferred solvent is an alcohol having the formula of $R^3(OH)_n$, an alkylene glycol of the formula $(HO)_nA(OH)_n$, a polyalkylene glycol or alkoxylated alcohol having the formula of $R^3O[CH_2CH(R^3)O]_nH$, or combinations of two or more thereof in which each $R^3$ can be the same or different and is a hydrocarbyl radical having 1 to about 10, preferably 1 to about 8, and most preferably 1 to 5 carbon atoms per radical. The presently preferred $R^3$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable solvents include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, and combinations of two or more thereof. The presently preferred solvent is ethylene glycol for the polyester produced therefrom has a wide range of industrial applications.

The catalyst composition can further comprise a cocatalyst. Examples of cocatalysts include, but are not limited to, cobalt/aluminum catalysts, antimony compounds, and combinations thereof. The cobalt/aluminum catalyst comprises a cobalt salt and an aluminum compound in which the mole ratio of aluminum to cobalt is in the range of from 0.25:1 to 16:1. The cobalt/aluminum catalyst is disclosed in the U.S. Pat. No. 5,674,801, disclosure of which is incorporated herein by reference.

The presently preferred antimony compound can be any antimony compounds that are substantially soluble in a solvent disclosed above. Examples of suitable antimony compounds include, but are not limited to, antimony oxides, antimony hydroxides, antimony halides, antimony sulfides, antimony carboxylates, antimony ethers, antimony glycolates, antimony alcoholates, antimony nitrates, antimony sulfates, antimony phosphates, and combinations of two or more thereof.

According to the first embodiment of the present invention, the molar ratio of phosphorus compound to titanium compound, measured as P:Ti, can be in the range of from about 0.001:1 to about 1:1, preferably about 0.01:1 to about 1:1, and most preferably 0.1:1 to 1:1. The molar ratio of amine to titanium compound can be in the range of from about 0.001:1 to about 1:1, preferably about 0.01:1 to about 1:1, and most preferably 0.1:1 to 1:1. The molar ratio of cocatalyst to titanium compound such as Sb:Ti or Co:Ti can be in the range of from about 0.01:1 to about 10:1. Presently it is preferred that the molar ratio of amine to phosphorus compound be about or less than 1:1. Alternatively, the titanium compound can be present in the catalyst composition in the range of from about 0.01 to about 15, preferably about 0.1 to about 10, and most preferably 0.5 to 5 percent (%), based on total weight of the composition as 100 %.

While the catalyst composition has been described in detail for its preferred application, as a polycondensation catalyst for the manufacture of polyalkylene terephthalates, the composition also has general utility as an esterification or transesterification catalyst in conventional processes requiring a highly active catalyst. For example, the catalyst composition may be employed in the reaction of phthalic anhydride and octyl alcohol to from dioctyl phthalate, a plasticizer for polyvinyl chloride, having low haze. The relative ratios of the catalyst components can be adjusted to meet the requirements of a particular application.

The catalyst composition can be produced by any means known to one skilled in the art. However, it is preferred it be produced by the process disclosed in the second embodiment of the present invention.

The catalyst composition can be produced in a solvent that is compatible with or does not interfere with an esterification or transesterification or polycondensation reaction. For example, if the catalyst composition is used as a polycondensation catalyst for producing PET, the composition is preferably produced in ethylene glycol; if the catalyst composition is used for producing PBT, the composition is preferably produced in 1,4-butanediol; and if the catalyst composition is used for producing polypropylene terephthalate PPT, the composition is preferably produced in 1,3-propylene glycol. For the production of dioctylphthalate, 2-ethylhexyl alcohol is preferred.

While the individual components can be combined in any order, it is preferred to first combine an amine and a solvent to produce a first mixture. The first mixture is then combined with a phosphorus compound to produce a second mixture because an amine aids the phosphorus compound to dissolve. Generally the combination for producing the first or second mixture can be stirred and can be carried out at a temperature in the range of from about 0° C. to about 100° C., preferably about 30° C. to about 50° C. Generally any amount of solvent can be used as long as the amount can substantially dissolve the composition and can be in the range of from about 5 to about 50, preferably about 10 to about 30, and most preferably 10 to 20 moles per mole of the titanium compound used in the composition.

The titanium compound can then be combined with the second mixture to produce the catalyst composition of the present invention. This step is preferably carried out under an inert atmosphere, such as nitrogen, carbon dioxide, helium, or combinations of two or more thereof to avoid liberating a flammable alcohol because this step is exothermic causing the temperature to rise 10 to 30° C. This step can be carried out by stirring for a period of time sufficient to substantially dissolve the titanium compound, generally about 5 minutes to about 20 hours or more followed by cooling to ambient temperature.

Alternatively, the phosphorus compound can be combined with a solvent and a titanium compound to form a complex. The complex can be isolated from the solvent by any conventional means such as filtration to produce an isolated complex. The isolated complex can then be combined with a mixture which comprises a solvent, an amine, or cocatalyst, or combinations of two or more thereof to produce the catalyst composition of the present invention.

The quantities of individual components can vary with the selected compounds and generally can be such that the molar ratio of each component to titanium in the catalyst compound produced is within the range disclosed above.

The structure of the catalyst system has not been established. Based on the observed exotherm, however, it is believed that the components have reacted or complexed in some manner to form binary or tertiary composition(s), at least to some extent, that render the catalyst composition especially useful as a polycondensation catalyst in the manufacture of polyalkylene terephthalates in general, and polyethylene terephthalate (PET) in particular.

According to the third embodiment of the present invention, a process which can be used in, for example, the production of an ester or polyester is provided. The process comprises contacting, in the presence of the catalyst composition, a carbonyl compound with an alcohol. The catalyst composition is the same as that disclosed above in the first embodiment of the present invention.

According to the third embodiment of the invention, any carbonyl compound which can react with an alcohol to produce an ester can be used. Generally, such carbonyl compounds include, but are not limited to, acids, esters, amides, acid anhydrides, acid halides, oligomers or polymers having repeat units derived from an acid, or combinations of two or more thereof. The presently preferred acid is an organic acid. The presently preferred processes are (1) the production of an ester such as, for example, bis(2-ethylhexyl)phthalate from phthalic anhydride and 2-ethylhexanol and (2) the polymerization of an acid or an ester and an alcohol for the production of a polyester.

A preferred process for producing an ester or polyester comprises, consists essentially of, or consists of contacting a reaction medium with a composition disclosed above in the first embodiment of the invention. The reaction medium can comprise, consist essentially of, or consist of (1) either an organic acid or an ester thereof and an alcohol, or (2) an alcohol and an oligomer having repeat units derived from an organic acid or ester.

The carbonyl compound can have the formula of $(HO)_m R^4(COOR')_p$ in which m is a number from 0 to about 10, preferably 0 to about 5, and most preferably 0 to 3; each $R^4$ and R' can be independently (1) hydrogen, (2) hydrocarbyl radical having a carboxylic acid group at the terminus, (3) hydrocarbyl radical, or (4) combinations of two or more thereof in which each radical can be substituted or unsubstituted; each radical has 1 to about 30, preferably about 3 to about 15 carbon atoms per radical which can be alkyl, alkenyl, aryl, alkaryl, aralkyl radical, or combinations of two or more thereof; and p can be an integer from 1 to a number equaling to the number of carbon atoms of $R^4$. Any anhydrides of the organic acids can also be used. The presently preferred organic acid is an organic acid having the formula of $HO_2CA^1CO_2H$ in which $A^1$ is an alkylene group, an arylene group, alkenylene group, or combinations of two or more thereof. Each $A^1$ has about 2 to about 30, preferably about 3 to about 25, more preferably about 4 to about 20, and most preferably 4 to 15 carbon atoms per group. Examples of suitable organic acids include, but are not limited to, terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, and combinations of two or more thereof. The presently preferred organic acid is terephthalic acid because the polyesters produced therefrom have a wide range of industrial applications. Examples of suitable esters include, but are not limited to, dimethyl adipate, dimethyl phthalate, dimethyl terephthalate, methyl benzoate, dimethyl glutarate, and combinations of two or more thereof.

Any alcohol that can esterify an acid to produce an ester or polyester can be used in the present invention. The presently preferred alcohol has the formula of $R^5(OH)_n$, an alkylene glycol of the formula $(HO)_nA(OH)_n$, or combinations thereof in which each $R^5$ can be the same or different and is a hydrocarbyl radical having 1 to about 20, preferably 1 to about 12, and most preferably 1 to 8 carbon atoms per radical. The presently preferred $R^5$ is an alkyl radical, either branched or straight chain. A can have 2 to about 10, preferably 2 to about 7, and most preferably 2 to 4 carbon atoms per molecule. Each n can be the same or different and is independently a number in the range of from 1 about to about 10, preferably 1 to about 7, and most preferably 1 to 5. Examples of suitable alcohols include, but are not limited to, ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof. The presently most preferred alcohol is an alkylene glycol such as ethylene glycol for the polyester produced therefrom has a wide range of industrial applications.

The contacting of reaction medium with the catalyst can be carried out by any suitable means. For example, the individual compositions of the reaction is medium can be combined before being contacted with the catalyst. However, it is presently preferred that the catalyst be first dissolved or dispersed in an alcohol by any suitable means such as mechanical mixing or stirring to produce a solution or dispersion followed by combining the solution or dispersion with (1) an organic acid, an ester, an oligomer of an organic acid, or combinations of two or more thereof and (2) an alcohol under a condition sufficient to effect the production of an ester or polyester.

The oligomer of the diacid and alkylene glycol generally has a total of about 1 to about 100, preferably from about 2 to about 10 repeat units derived from the diacid and alkylene oxide.

A suitable condition to effect the production of a polyester can include a temperature in the range of from about 150° C. to about 350° C., preferably about 200° C. to about 300° C., and most preferably 250° C. to about 300° C. under a pressure in the range of from about 0.001 to about 10 atmospheres for a time period of from about 1 to about 20, preferably about 1 to about 15, and most preferably 1 to 10 hours.

The molar ratio of the alcohol (or alkylene glycol) to carbonyl compound (or organic acid or ester thereof) can be any ratio so long as the ratio can effect the production of a polyester. Generally the ratio can be in the range of from about 1:1 to about 10:1, preferably about 1:1 to about 5:1, and most preferably about 1:1 to about 3:1. The molar ratio of the alcohol (or alkylene glycol) to carbonyl compound (or organic acid or ester thereof) for the oligomer having repeat units derived from the carbonyl compound (or organic acid or ester thereof) can be q:(q- 1) in which q can be a number in the range of from about 2 to about 100, preferably about 2 to about 10 and most preferably about 2 to about 5.

The catalyst can be present in the range of about 0.0001 to about 30,000 parts per million by weight (ppmw) of the polymerization medium, preferably about 0.001 to about 1,000 ppmw, and most preferably 0.1 to about 100 ppmw. Other ingredients also can be present to enhance catalyst stability or performance. While the advantages of the catalyst can be obtained with polyalkylene terephthalates in general, the advantages are particularly evident as a substitute for most of antimony in the manufacture of PET since color purity is an important criteria for commercial articles typically made from PET.

The catalyst composition can be used in producing esters or polyesters by using any of the conventional melt or solid state techniques. The catalyst compositions are compatible with conventional esterification and transesterification catalysts (e.g., manganese, cobalt, and/or zinc salts) and may be introduced to the production process concurrent with, or following, introduction of the esterification catalyst. The catalyst compositions also have been found to be effective in promoting the esterification reaction, and may be used as a substitute for some or all of the esterification catalyst as well as the polycondensation catalyst.

The following Examples are provided to further illustrate the present invention and are not to be construed as to unduly limit the scope of the invention.

EXAMPLES

DMT (dimethyl terephthalate) and TPA (terephthalic acid) oligomers were made following Procedures A and B. The oligomers were blended with various catalysts following Procedure C. Color of the polymer was measured as described in Procedure D.

Prepolymer Prep and Testing

A. Antimony Free DMT Oligomer

The oligomers used in these examples were prepared using dimethyl terephthalate, ethylene glycol, zinc acetate, with no added antimony. It was prepared as follows:

An autoclave was charged with 100 pounds of dimethyl terephthalate, 67 pounds of ethylene glycol and 4.4 gms of zinc acetate dihydrate. The batch was heated to 240° C. at an agitation speed of 15 rpm, and 33 pounds of methanol and 14.3 pounds of ethylene glycol removed. The charge was then heated to 275° C. over the course of 90 minutes, and the remaining ethylene glycol removed at 285° C. and below 2 mm Hg vacuum. Once the condensation mass was judged to be complete, the molten mass was extruded into an aqueous bath to solidify the product. The resultant polymer was dried to remove residual moisture before use.

B. Antimony Free TPA Oligomer

When an oligomer was prepared from terephthalic acid (TPA) instead of DMT, essentially the same procedure was used except for the omission of zinc acetate catalyst C. Oligomer/Catalyst Blends A 1-liter resin kettle was provided with an Jiffy Mixer agitator rotating at 40 rpm, a thermocouple, condenser and nitrogen sweep. To this kettle was added the catalyst to be tested, 115 ml of ethylene glycol, and 400 gm of TPA oligomer prepared as in B. The agitator was turned on and the temperature was increased to 275° C. over a period of about 2.5 hours. The contents were polymerized by holding under agitation at 275° C. and a pressure of 120 torr for 20 minutes, and at 280° C. and a pressure of 30 torr for an additional 20 minutes. The contents were then held under agitation at 285° C. at 1 to 2 mm Hg pressure for a time sufficient to reach 15 oz-in (ounce-inches) torque as measured by an Electro-Craft Motomatic torque controller. The time for this step was recorded as the Finish Time, and varied with the catalyst used. The polymer melt was then poured into a water bath to solidify the melt, and the resultant solid annealed at 150° C. for 12 hours and ground to pass through a 2 mm filter for color measurements using the previously described spectrophotometer. Results comparing the Finish Time in minutes and the Color as measured spectrophotometrically as described in D are given in Tables 1 and 2.

D. Color Measurement

In the following examples, polymer color was measured in terms of the L-value and b-value, using an instrument such as the SP-78 Spectrophotometer. The L-value shows brightness, with the greater the numerical value showing higher (desirable) brightness. Preferably, the L-value will be equal to or higher than that of the polymer made using antimony catalyst. The b-value shows the degree of yellowness, with a higher numerical value showing a higher (undesirable) degree of yellowness. Preferably, the b-value will be equal to or lower than that of the polymer made using antimony catalyst.

Control A

To a 2,000-ml flask equipped with a water-cooled jacket, agitator, thermocouple, dropping funnel and a nitrogen sweep was added 900 gm of tetraisopropyl titanate (3.2 mole). Then 576 gm of "ZELEC TY" acid phosphation mass (3.2 mole) was added drop-wise with cooling keeping the temperature under 50° C. (ZELEC TY acid phosphation mass is nominally a 1:1 molar mixture of monobutyl and dibutyl phosphate esters, but analyses indicate it also contains some amount of the corresponding pyrophosphate esters. It is available from E. I. du Pont de Nemours and Company). The catalyst is a liquid and can be used as such. When this catalyst, with no amine, is placed in ethylene glycol, a suspension is formed. This must be mixed before use to get a uniform mixture.

Example 1

A 250 ml flask equipped with a water-cooled condenser, agitator, thermocouple, dropping funnel and a nitrogen sweep, was charged with 33 gm (0.116 moles) of tetra-isopropyl titanate (TYZOR TPT) and 23 gm of isopropyl alcohol. Agitation was started and 21 gm (0.116 moles) of ZELEC TY acid phosphation mass was added dropwise over 10 minutes. The reaction mass was heated to 60C and held 1 hr. after which 15.5 gm (0.116 moles) of 2[2-(dimethylamino)ethoxy]ethanol was added dropwise. The reaction mass was held 2 hr. at 60C and then bottled out. The resultant pale yellow liquid contained 5.99% of Ti and was glycol-soluble.

Control B

A 250 ml flask equipped as in example 1 was charged with 50 gm (0.176 moles) of tetra-isopropyl titanate (Tyzor® TPT) and 34.8 gm of isopropyl alcohol. Agitation was started and 30.69 gm (0.176 moles) of a mixed butyl phosphate ester obtained from Albright and Wilson was added dropwise. This mixture of mono- and di-butyl phosphate ester has no pyrophosphate present. The solution was heated to 60° C. and held for 2 hrs., then 23.42 gm (0.176 moles) of 2[2-(dimethylamino)ethoxy]ethanol was added dropwise and the reaction mass stirred at 60° C. for another 4 hr. The product was a pale yellow solution containing 6.06% Ti. and was glycol-soluble.

In Table 1, the Ti component was tetraisopropyl titanate, the P component was a mixed butyl phosphate ester and the A component was dimethylamino ethoxy ethanol (DMAEE). The amount of titanium was 25 parts per million (ppm) by weight of starting oligomer. The finish time is the time on hold at 2 mm Hg pressure to achieve the goal viscosity. These runs were carried out with TPA oligomer of Procedure B. All catalysts are glycol-soluble except where so noted.

TABLE 1

Comparison of Catalysts for Finish Time and Color
TPA based oligomer, 2 mm Hg, 285 C., 25 ppm Ti

| Example No. | Mole Ratio Ti | P | A | Other Component | Finish Time (min.) | Color L | b | Notes |
|---|---|---|---|---|---|---|---|---|
| | 0.0 | 0.0 | 0.0 | Antimony | 220 | 72.14 | 5.12 | 1 |
| Control A | 1.0 | 1.0 | 0.0 | None | 140 | 74.45 | 3.44 | 2,3 |
| 1 | 1.0 | 1.0 | 1.0 | DMAEE | 120 | 76.85 | 5.51 | 2 |
| Control B | 1.0 | 1.0 | 1.0 | DMAEE | 210 | 77.17 | 8.26 | 4 |

Notes:
1. This is a Control Run using 300 ppm antimony catalyst, shown for comparison.
2. This catalyst was prepared using ZELEC TY mixed butyl phosphate as the phosphate ester.
3. This catalyst did not contain the A component and was ethylene glycol insoluble.
4. This catalyst was prepared using Albright and Wilson mixture of mono- and di-butyl phosphate ester, with no measurable amount of pyrophosphate present.

Table 1 illustrates that the use of a phosphate ester mixture containing significant amounts of pyrophosphate (Example 1) has a significantly faster condensation rate than if a mixture containing only mono- and diester was used (Control B). Control A was insoluble in ethylene glycol, undesirable for commercial use. In addition to the shorter condensation time obtained with the mixture containing pyrophosphates, this run also demonstrated an improved polymer color.

In the following series of examples, various tertiary amines were used as solubilizing agent. The Ti-P-A catalysts of this invention were then tested as in Table 1, except that a DMT based oligomer was used for the test and the finish pressure was changed from 2mm Hg to 1 mm Hg. Results are given in Table 2.

Example 2

Titanate-phosphate ester-amine catalyst mixture was prepared as follows. To a 500-ml flask equipped with a water-cooled jacket, agitator, thermocouple, dropping funnel and a nitrogen sweep was added 176 gm of tetraisopropyl titanate (0.6 mole) Tyzor® TPT. Then 56 gm of "Zelec" TY acid phosphation mass (0.3 mole) was added drop-wise with cooling keeping the temperature near 40° C.

To 13.2 gm of the above material (0.035 mole of titanate and 0.018 mole of acid phosphate) was added 1.85 gm (0.018 mole) of diethanolamine at ambient temperature.

Example 3

A 100 ml flask equipped with an agitator, thermometer, nitrogen inlet and condenser was charged with 15 gm(0.053 moles) of tetra-isopropyl titanate (Tyzor® TPT from E. I. du Pont de Nemours and Company). Agitation was started and 4.8 gm (0.026 moles) of a mixed butyl phosphate ester was added dropwise over 10 minutes (ZELEC TY acid phosphation mass). The reaction mass was then neutralized with 3.09 gm (0.05 moles) of 2[2-(dimethylamino)ethoxy] ethanol. The reaction mass was then diluted with 16.37 gm of ethylene glycol, to give a clear, pale yellow solution containing 6.44% Ti, which was soluble in ethylene glycol at the 5% level.

Example 4

A 100 ml flask equipped as in Example 3 was charged with 30 gm (0.106 moles) of tetra-isopropyl titanate (Tyzor® TPT). Agitation was started and 9.6 gm(0.053 moles) of a mixed butyl phosphate ester (ZELEC TY acid phosphation mass) was added dropwise over 10 minutes. The reaction mass was neutralized with 6.13 gm (0.053 moles) of tetramethylethylenediamine to give a clear, pale yellow solution containing 11.1% Ti, which was soluble in ethylene glycol at the 5% level.

Example 5

To a 250 ml flask, equipped as in Example 3 was charged 50 gm (0.176 moles) of tetra-isopropyl titanate (Tyzor® TPT) and 35 gm of isopropyl alcohol. Agitation was started and 16 gm (0.088 moles) of a mixed butyl phosphate ester (ZELEC TY acid phosphation mass) was added dropwise over 10 minutes. The reaction mass was heated to 60C and held for 1 hr. after which 11.7 gm (0.088 moles) of 2[2-(dimethylamino)ethoxy]ethanol was added dropwise and agitation continued for 2 hr. at 60C. The resultant pale yellow solution contained 7.46% Ti and was ethylene glycol soluble at the 5% level.

Control C

To a 500 ml flask equipped as in Control B was charged 300 gm (1.055 moles) of tetra-isopropyl titanate (Tyzor®

TPT). Agitation was started and 96 gm (0.528 moles) of a mixed butyl phosphate ester (ZELEC TY acid phosphation mass) was added dropwise. The reaction mass was agitated another 30 minutes at room temperature to give a clear, pale yellow solution containing 12.76% Ti. This material was not glycol soluble at the 5% level.

TABLE 2

Comparison of Catalysts for Finishing Time and Color
DMT Based Oligomer, 1 mm Hg, 285 C., 25 ppm Ti

| Example No. | Mole Ratio | | | Other Component | Finish Time (min.) | Color | | Notes |
|---|---|---|---|---|---|---|---|---|
| | Ti | P | A | | | L | b | |
| — | 0.0 | 0.0 | 0.0 | Antimony | 65 | 72.60 | 6.17 | 1 |
| 2 | 1.0 | 0.5 | 0.5 | DEA | 80 | 71.33 | 10.85 | 2 |
| 3 | 1.0 | 0.5 | 0.5 | DMEAE | 60 | 72.47 | 9.73 | 3 |
| 4 | 1.0 | 0.5 | 0.5 | TMEDA | 67 | 70.21 | 11.18 | 4 |
| 5 | 1.0 | 0.5 | 0.5 | DMAEE | 60 | 74.98 | 8.80 | 5 |
| Control C | 1.0 | 0.5 | 0 | | 62 | 76.65 | 10.44 | 6 |

Notes:
1. This is a control run of antimony run at 260 ppm, shown for comparison.
2. DEA is diethanolamine.
3. DEAE is 2-diethylaminoethanol.
4. TMEDA is tetramethylethylenediamine.
5. DMAEE is 2[2-(dimethylamino)ethoxy]ethanol.
6. This is a comparison example (Control C) where an amine was not added to impart glycol solubility.

Table 2 illustrates that the addition of tertiary amines to impart glycol solubility enables glycol solubility without harming the condensation rates of the catalysts.

In the following series of examples, various combinations of antimony catalyst were tested with the tetraisopropyl titanate/mixed butyl phosphate ester/DMAEE catalyst of Example 5. These were then tested as in Table 1, except that a DMT based oligomer was used for the test. For greater accuracy in these comparative runs, the intrinsic viscosity (I.V.) of the resulting polymer was determined and the measured finishing time was corrected to a constant intrinsic viscosity of 0.66. The amount of titanium and antimony catalyst was varied as shown in Table 3.

TABLE 3

Comparison of Antimony Catalysts for Finishing Time and Color
DMT Based Oligomer, 2 mm Hg

| Example No. | Mole Ratio Catalyst | | | ppm Metal | | Finish Time (min.) | | Color | | Notes |
|---|---|---|---|---|---|---|---|---|---|---|
| | Ti | P | A | Ti | Sb | Meas. | Corr. | L | b | |
| Control D | 0 | 0 | 0 | 0 | 280 | 97 | 98 | — | — | 1,2 |
| 6 | 1 | 0.5 | 0.5 | 3 | 280 | 87 | 87 | — | — | 2,3 |
| 7 | 1 | 0.5 | 0.5 | 6 | 140 | 86 | 76 | — | — | 2,3 |
| Control E | 0 | 0 | 0 | 0 | 375 | 98 | 92 | 70.5 | −4.0 | 1 |
| 8 | 1 | 0.5 | 0.5 | 20 | 100 | 80 | 77.5 | 75.0 | 3.3 | 3 |

Notes:
1. This is a control run with antimony, shown for comparison.
2. The color of product was not measured.
3. This run tested a combination of antimony with the composition of Example 5.

The above runs show a significant reduction in finishing time obtained by using antimony in combination with the titanium/phosphate/amine composition of Example 5, corresponding to an increase in productivity of nearly 20%. In addition, in Example 8 the amount of antimony in the product was cut to nearly one quarter the control amount, and the color of the product, as shown by comparison with Tables 1 and 2, remained satisfactory.

What is claimed is:

1. A composition comprising an organic titanium compound, a phosphorus compound, an amine, and a solvent wherein said phosphorus compound is selected from the group consisting of $(R^1O)_x(PO)(OH)_{3-x}$, $(R^1O)_y(P_2O_3)(OH)_{4-y}$, and combinations thereof; said amine is a tertiary amine; each $R^1$ is independently a linear or branched alkyl radical containing from 1 to about 20 carbon atoms per radical; x is 1 or 2; and y is 1, 2, or 3.

2. A composition according to claim 1 further comprising a cocatalyst selected from the group consisting of a cobalt/aluminum catalyst, an antimony compound, and combinations thereof.

3. A composition according to claim 1 wherein said solvent is an alcohol.

4. A composition according to claim 1 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

5. A composition according to claim 1 wherein said solvent is ethylene glycol.

6. A composition according to claim 1 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

7. A composition according to claim 5 wherein said titanium compound is selected from the group consisting of tetra isopropyl titanate, tetra n-butyl titanate, and combinations thereof.

8. A composition according to claim 1 wherein said phosphorus compound is selected from the group consisting of butyl phosphate, dibutyl phosphate, propyl phosphate, dipropyl phosphate, ethyl pyrophosphate, diethyl pyrophosphate, triethyl pyrophosphate, butyl pyrophosphate, dibutyl pyrophosphate, tributyl pyrophosphate, octyl phosphate, dioctyl phosphate, nonyl phosphate, dinonylphosphate, and combinations of two or more thereof.

9. A composition according to claim 7 wherein said phosphorus compound is selected from the group consisting of butyl phosphate, dibutyl phosphate, dibutyl pyrophosphate, and combinations of two or more thereof.

10. A composition according to claim 9 wherein said amine is selected from the group consisting of 2[2-(dimethylamino)ethoxy]ethanol, 2-dimethylaminoethanol, 2-diethylaminoethanol, tetra-methylethylenediamine and combinations of two or more thereof.

11. A composition according to claim 1 wherein said titanium compound is selected from the group consisting of tetra isopropyl titanate, tetra n-butyl titanate, and combinations thereof, said phosphorus compound is selected from the group consisting of butyl phosphate, dibutyl phosphate, dibutyl pyrophosphate, and combinations of two or more thereof, said amine is selected from the group consisting of 2[2-(dimethylamino)ethoxy]ethanol, 2-dimethylaminoethanol, 2-diethylaminoethanol, and tetra-methylethylenediamine and combinations of two or more thereof, and said solvent is ethylene glycol.

12. A composition according to claim 11 further comprising a cocatalyst selected from the group consisting of a cobalt/aluminum catalyst, an antimony compound, and combinations thereof.

13. A composition according to claim 1 wherein said composition is produced by combining said organic titanium compound, said phosphorus compound, said amine, and said solvent under a condition sufficient to produce a substantial solution.

14. A composition according to claim 11 wherein said composition is produced by combining said organic titanium compound, said phosphorus compound, said amine, and said solvent under a condition sufficient to produce a substantial solution.

15. A composition according to claim 14 said composition is produced by further comprising combining said composition with a cocatalyst selected from the group consisting of a cobalt/aluminum catalyst, an antimony compound, and combinations thereof.

16. A composition produced by combining a titanium compound, a phosphorus compound, an amine, and a solvent wherein said phosphorus compound is selected from the group consisting of $(R^1O)_x(PO)(OH)_{3-x}$, $(R^1O)_y(P_2O_3)(OH)_{4-y}$, and combinations thereof; said amine is a tertiary amine; each $R^1$ is independently a linear or branched alkyl radical containing from 1 to about 20 carbon atoms per radical; x is 1 or 2; and y is 1, 2, or 3.

17. A composition according to claim 16 wherein said composition is produced by further combining a cocatalyst with said composition and said cocatalyst is selected from the group consisting of a cobalt/aluminum catalyst, an antimony compound, and combinations thereof.

18. A composition according to claim 16 wherein said solvent is an alcohol.

19. A composition according to claim 16 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

20. A composition according to claim 16 wherein said solvent is ethylene glycol.

21. A composition according to claim 16 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

22. A composition according to claim 20 wherein said titanium compound is selected from the group consisting of tetra isopropyl titanate, tetra n-butyl titanate, and combinations thereof.

23. A composition according to claim 16 wherein said phosphorus compound is selected from the group consisting of butyl phosphate, dibutyl phosphate, propyl phosphate, dipropyl phosphate, ethyl pyrophosphate, diethyl pyrophosphate, triethyl pyrophosphate, butyl pyrophosphate, dibutyl pyrophosphate, tributyl pyrophosphate, octyl phosphate, dioctyl phosphate, nonyl phosphate, dinonylphosphate, and combinations of two or more thereof.

24. A composition according to claim 22 wherein said phosphorus compound is selected from the group consisting of butyl phosphate, dibutyl phosphate, dibutyl pyrophosphate, and combinations of two or more thereof.

25. A composition according to claim 24 wherein said amine is selected from the group consisting of 2[2-(dimethylamino)ethoxy]ethanol, 2-dimethylaminoethanol, 2-diethylaminoethanol, tetra-methylethylenediamine and combinations of two or more thereof.

26. A composition according to claim 16 wherein said titanium compound is selected from the group consisting of tetra isopropyl titanate, tetra n-butyl titanate, and combinations thereof; said phosphorus compound is selected from the group consisting of butyl phosphate, dibutyl phosphate, dibutyl pyrophosphate, and combinations of two or more thereof; said amine is selected from the group consisting of 2[2-(dimethylamino)ethoxy]ethanol, 2-dimethylaminoethanol, 2-diethylaminoethanol, and tetra-methylethylenediamine and combinations of two or more thereof; and said solvent is ethylene glycol.

27. A composition according to claim 26 wherein said composition is produced by further combining a cocatalyst with said composition and said cocatalyst is selected from the group consisting of a cobalt/aluminum catalyst, an antimony compound, and combinations thereof.

28. A process comprising combining an organic titanium compound, a phosphorus compound, an amine, and a solvent wherein said phosphorus compound is selected from the group consisting of $(R^1O)_x(PO)(OH)_{3-x}$, $(R^1O)_y(P_2O_3)(OH)_{4-y}$, and combinations thereof; said amine is a tertiary amine; each $R^1$ is independently a linear or branched alkyl radical containing from 1 to about 20 carbon atoms per radical; x is 1 or 2; and y is 1, 2, or 3.

29. A process according to claim 28 further comprising combining said titanium compound, said phosphorus compound, said amine, and said solvent with a cocatalyst selected from the group consisting of a cobalt/aluminum catalyst, an antimony compound, and combinations thereof.

30. A process according to claim 28 wherein said solvent is an alcohol.

31. A process according to claim 28 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

32. A process according to claim 28 wherein said solvent is ethylene glycol.

33. A process according to claim 28 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

34. A process according to claim 32 wherein said titanium compound is selected from the group consisting of tetra isopropyl titanate, tetra n-butyl titanate, and combinations thereof.

35. A process comprising contacting, in the presence of a catalyst, a carbonyl compound and an alcohol wherein said catalyst comprises an organic titanium compound, a phosphorus compound, an amine, and a solvent wherein said phosphorus compound is selected from the group consisting of $(R^1O)_x(PO)(OH)_{3-x}$, $(R^1O)_y(P_2O_3)(OH)_{4-y}$, and combinations thereof; said amine is a tertiary amine; each $R^1$ is independently a linear or branched alkyl radical containing from 1 to about 20 carbon atoms per radical; x is 1 or 2; and y is 1, 2, or 3.

36. A process according to claim 35 wherein said catalyst further comprises a cocatalyst selected from the group consisting of a cobalt/aluminum catalyst, an antimony compound, and combinations thereof.

37. A process according to claim 35 wherein said solvent is an alcohol.

38. A process according to claim 35 wherein said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

39. A process according to claim 35 wherein said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical.

40. A composition according to claim 35 wherein said titanium compound is selected from the group consisting of tetra isopropyl titanate, tetra n-butyl titanate, and combinations thereof.

41. A process according to claim 35 wherein said carbonyl compound is selected from the group consisting of $(OH)_mR^4(COOR')_p$, $HO_2CA^1CO_2H$, acid anhydride, and combinations of two or more thereof; said alcohol is selected from the group consisting of $R^5(OH)_n$, $(HO)_nA(OH)_n$, and combinations thereof; m is a number from 0 to about 10; $R^4$ and R' are each independently selected from the group consisting of hydrogen, a hydrocarbyl radial having a carboxylic acid group at the terminus of the radical, a hydrocarbyl radical, and combinations of two or more thereof; each radial has 1 to about 30 carbon atoms and is selected from the group consisting of alkyl radical, aryl radical, alkaryl radical, aralkyl radical, alkenyl radical, and combination of two or more thereof; p is an integer from 1 to a number equaling to the number of carbon atoms of $R^4$; A is selected from the group consisting of alkylene group, arylene group, alkenylene group, and combinations of two or more thereof; and $R^5$ is a branched or straight alkyl radical.

42. A process according to claim 35 wherein said alcohol is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof.

43. A process according to claim 35 wherein said alcohol is ethylene glycol.

44. A process according to claim 35 wherein said carbonyl compound is selected from the group consisting of terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, any ester of these acids, and combinations of two or more thereof.

45. A process according to claim 43 wherein said carbonyl compound is terephthalic acid.

46. A process according to claim 43 wherein said carbonyl compound is dimethyl terephthalate.

47. A process according to claim 43 wherein said carbonyl compound is phthalic acid and said alcohol is 2-ethyl hexanol.

48. A process according to claim 43 wherein said carbonyl compound is phthalic anhydride and said alcohol is 2-ethyl hexanol.

49. A composition according to claim 42 wherein carbonyl compound is selected from the group consisting of terephthalic acid, isophthalic acid, napthalic acid, succinic acid, adipic acid, phthalic acid, glutaric acid, acrylic acid, oxalic acid, benzoic acid, maleic acid, propenoic acid, 4-hydroxybenzoic acid, 12-hydroxydecanoic acid, 6-hydroxyhexanoic acid, 4-hydroxycinnamic acid, 4-hydroxymethylbenzoic acid, 4-hydroxyphenylacetic acid, azelaic acid, salicylic acid, caproic acid, stearic acid, palmitic acid, fumaric acid, naphthlane dicarboxylic acid, citric acid, trimesic acid, pamoic acid, sebacic acid, any anhydride of these acids, any ester of theses acids, and combinations of two or more thereof;

said alcohol is selected from the group consisting of ethanol, propanol, isopropanol, butanol, ethylene glycol, propylene glycol, isopropylene glycol, butylene glycol, I-methyl propylene glycol, pentylene glycol, diethylene glycol, triethylene glycol, 2-ethyl hexanol, stearyl alcohol, 1,6-hexanediol, glycerol, pentaerythritol, and combinations of two or more thereof;

said titanium compound has the formula $Ti(OR)_4$ wherein each R is independently selected from the group consisting of an alkyl radical, a cycloalkyl radical, aralkyl radical, and combinations of two or more thereof and contains from 1 to about 30 carbon atoms per radical;

said phosphorus compound is selected from the group consisting of butyl phosphate, dibutyl phosphate, propyl phosphate, dipropyl phosphate, ethyl pyrophosphate, diethyl pyrophosphate, triethyl pyrophosphate, butyl pyrophosphate, dibutyl pyrophosphate, tributyl pyrophosphate, octyl phosphate, dioctyl phosphate, nonyl phosphate, dinonylphosphate, and combinations of two or more thereof;

said amine is selected from the group consisting of 2[2-(dimethylamino)ethoxy]ethanol, 2-dimethylaminoethanol, 2-diethylaminoethanol, and tetra-methylethylenediamine and combinations of two or more thereof; and said solvent is selected from the group consisting of ethanol, propanol, isopropanol, butanol, ethylene glycol, propylene glycol, isopropylene glycol, butylene glycol, 1-methyl propylene glycol, pentylene glycol, diethylene glycol, triethylene glycol, diethylene glycol monomethyl ether, triethylene glycol monomethylether, 2-ethyl hexanol, and combinations of two or more thereof.

50. A composition according to claim 49 wherein said titanium compound is selected from the group consisting of tetra isopropyl titanate, tetra n-butyl titanate, and combinations thereof; said phosphorus compound is selected from the group consisting of butyl phosphate, dibutyl phosphate, dibutyl pyrophosphate, and combinations or two or more thereof; and said solvent is ethylene glycol, said alcohol is ethylene glycol; said carbonyl compound is selected from the group consisting of terephthalic acid, dimethyl terephthalate, and combinations thereof, and said solvent is ethylene glycol.

* * * * *